No. 763,022. PATENTED JUNE 21, 1904.
A. SABROE.
MACHINERY FOR SEPARATING STONE FROM CLAY.
APPLICATION FILED JULY 13, 1903.
NO MODEL. 2 SHEETS—SHEET 1.
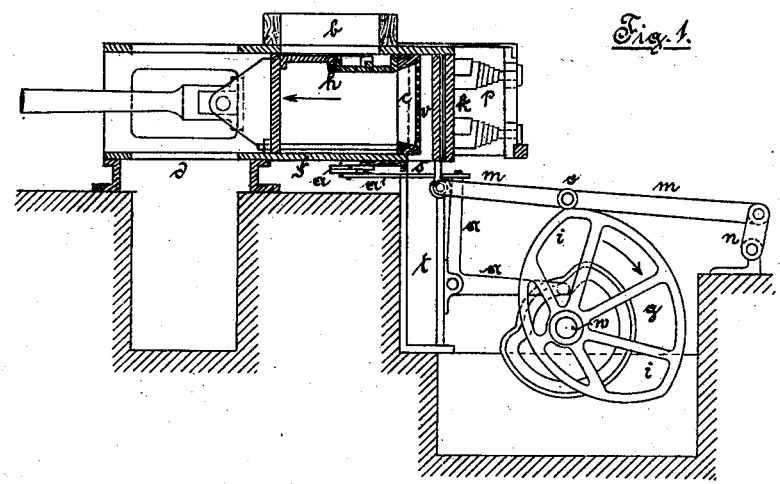
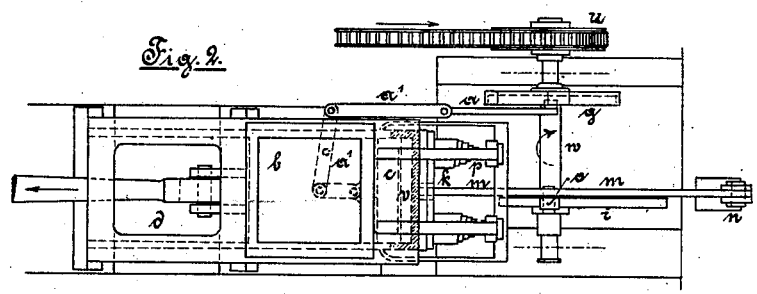
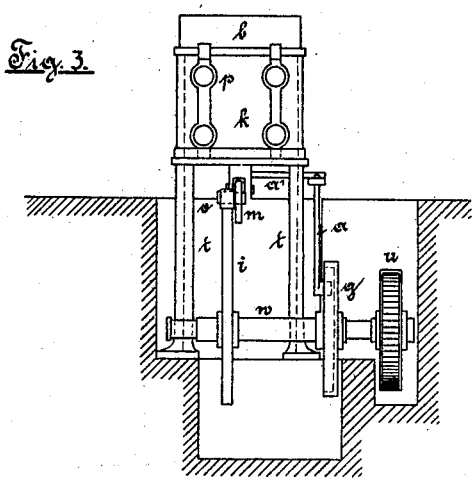

No. 763,022. PATENTED JUNE 21, 1904.
A. SABROE.
MACHINERY FOR SEPARATING STONE FROM CLAY.
APPLICATION FILED JULY 13, 1903.
NO MODEL. 2 SHEETS—SHEET 2.
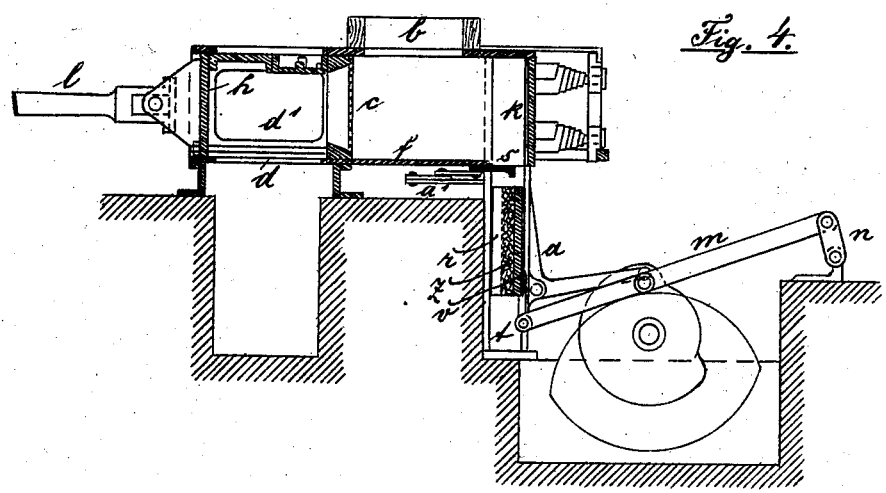
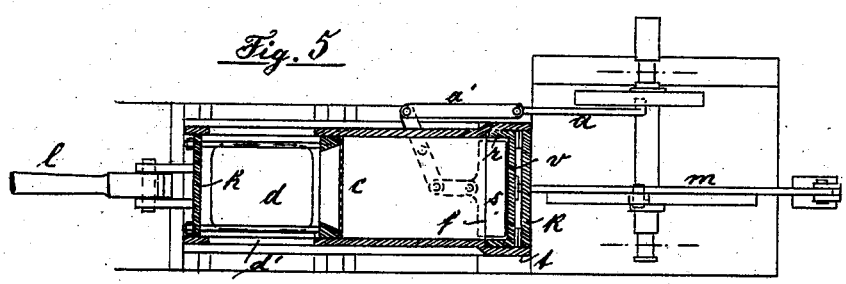
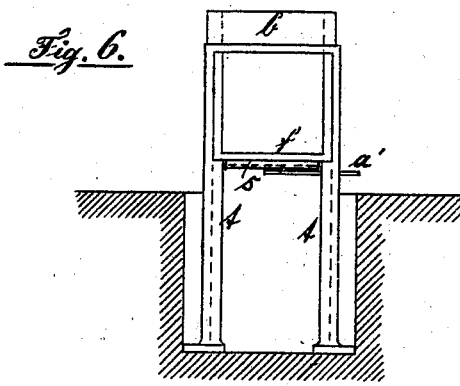

No. 763,022. Patented June 21, 1904.

UNITED STATES PATENT OFFICE.

AXEL SABROE, OF AASTRUP, NEAR HADERSLEBEN, GERMANY.

MACHINERY FOR SEPARATING STONE FROM CLAY.

SPECIFICATION forming part of Letters Patent No. 763,022, dated June 21, 1904.

Application filed July 13, 1903. Serial No. 165,317. (No model.)

*To all whom it may concern:*

Be it known that I, AXEL SABROE, brick manufacturer, of Aastrup, near Hadersleben, Germany, have invented certain new and useful Improvements in Machinery for Separating Stone from Clay; and I do hereby declare that the following is a full, clear, and exact description of the invention, which will enable others to make and use the same.

According to the present invention a grate secured in front of a skeleton frame is moved against the mass of clay, being closed in in such a manner that the soft mass is forced through the grate and accumulates within said frame, while the stones are pushed forward with the grate. In moving afterward the frame and the grate backward the purified clay in the frame is removed therefrom by falling down through an opening in the rear of the machine as soon as the frame arrives in position over this opening, while the stones remaining in front of the grate and having been pressed against the flanged plate or flat box, which descends automatically, are removed when said flange-plate ascends again and are scraped out of this plate by a scraper, while the plate moves up into its original position. This removal is repeated at every operation, and therefore the machine can work without interruption.

In the accompanying drawings, forming part of this specification, Figure 1 shows an apparatus embodying my invention in longitudinal section with certain parts in elevation. Fig. 2 is a plan view of the same, and Fig. 3 is an end elevation. Figs. 4 and 5 are sectional views similar to Figs. 1 and 2, showing the parts in different position. Fig. 6 is an end elevation of the machine-frame, the plate $v$ and wall $k$ being omitted.

A skeleton frame $h$, having an opening at the top and bottom, is provided at its front end with a grate or netting of wire $c$. Said grate may be made also of metal strips or of perforated sheet metal or of a perforated board. The said frame $h$ is moved to and fro in any suitable well-known manner upon a plate $f$, receiving its reciprocatory motion by means of a connecting-rod $l$ from any suitable motor. The material—that is, the clay—well prepared for molding the bricks in the well-known manner, drops from a suitable hopper (not shown) through an opening $b$ at its bottom into the space left in front of the frame $h$, when the same is withdrawn into its retracted position. At the next forward stroke the clay is compressed and the pure clay passes through the grate into the interior of frame $h$, while the stony matter, with the impure clay, goes forward before the grate. The purified clay after its separation from the stones falls down through an opening $d$ in plate $f$ at the subsequent backward motion of the frame. A vertically-movable plate $v$ is adapted to move in guides $t$ and is provided with flanges or upturned edges on the sides, thus forming a box-like receptacle for the impurities of the clay, principally the stones in the same. The plate $v$ is supported against pressure by a back plate $k$, which bears against a number of strong springs $p$, suitably supported in the frame. A scraper $s$ is adapted to be moved to and fro below the plate $f$, so that the opening through which the plate $v$ passes in its movement may be closed.

A counter-shaft $w$, receiving motion from the main shaft (not shown) by means of a belt or a chain $u$, carries a cam-disk $i$, having part of its edge curved concentrically adapted to act on a roller $o$ of a lever $m$ and maintain it, with the plate $v$, being connected thereto, in an elevated position. The opposite end of said lever $m$ is hinged to a link $n$, being pivoted to a bearing which is rigidly secured to the brickwork or floor. It is obvious that the cam $i$, turning in the direction of the arrow, Fig. 1, allows the full descent of the plate $v$. A second cam $g$, having a groove in its side, with two opposite parts curved concentrically, one nearer to the shaft than the other, as shown in Fig. 1, governs a bell-crank lever $a$, by which the scraper $s$ receives its reciprocating motion.

The mode of operation is the following:

The clay falls through the opening $b$ upon the plate $f$ when the frame $h$ has arrived at the end of its stroke, so that the material falls in front of the grate $c$. During the forward motion the clay is pressed against the plate $v$, the soft parts of the mass being allowed to work through the grate and to accumulate in the frame $h$, while the stones are pushed forward, being finally embedded in the box-like plate $v$, filling the same in the shape of a cake. During the back stroke of the frame $h$ with the grate $c$ the purified mass of clay is carried along and is brought over the opening $d$ and falls down, so that it can be removed for use. The motion of the plate $v$ and of the lever $m$ is so timed that it descends and rises during the back stroke of the frame $h$ and that it remains stationary in its elevated position during the forward stroke. The scraper $s$ is moved by the bell-crank lever $a$ and suitable connecting-links $a'$ such a way that it goes forward as soon as the plate $v$ has been pulled down, thus closing to a great extent the aperture through which the plate $v$ passes. The scraper $s$ remains in this advance position while the plate $v$ rises, thereby scraping off the stony matter. It also occupies this advance position while the frame $h$, with the grate $c$, advances to operate upon another charge, thus preventing the escape of the clay into the pit for the stony matter.

Having thus described my invention, I claim—

1. A device for separating stony masses from prepared clay in brick-factories comprising a reciprocating frame and a box-like plate movable at right angle thereto said frame carrying in front a screen or grate adapted to press the matter in front of it, during its forward stroke with the frame, against said plate substantially as described and for the purpose set forth.

2. In a machine for separating stone from clay in combination a reciprocating frame carrying a grate $c$ a plate or table $f$, having an opening $d$ over a pit for the purified clay, a hopper-outlet $d$ over said table, a spring-supported plate $k$ at the end of the table, a box-like plate $v$ upon plate $k$, provided with means to reciprocate said plate $v$ at right angles to the motion of frame $h$, and a scraper $s$, under the table $f$ near, its end being provided with means to move it against plate $v$ in order to scrape the bottom thereof while the latter reciprocates substantially as described and for the purpose set forth.

In testimony whereof I affix my signature.

AXEL SABROE.

In presence of—
   J. HERMES,
   T. RÖPKE.